US010539427B2

(12) United States Patent
Fuchs

(10) Patent No.: US 10,539,427 B2
(45) Date of Patent: Jan. 21, 2020

(54) SYSTEM AND METHOD FOR IMPROVED ROUTING THAT COMBINES REAL-TIME AND LIKELIHOOD INFORMATION

(71) Applicant: Uber Technologies, Inc., San Francisco, CA (US)

(72) Inventor: Gil Fuchs, Nes Tziona (IL)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 16/117,773

(22) Filed: Aug. 30, 2018

(65) Prior Publication Data

US 2019/0017843 A1 Jan. 17, 2019

Related U.S. Application Data

(63) Continuation of application No. 14/932,552, filed on Nov. 4, 2015, now Pat. No. 10,082,403, which is a
(Continued)

(51) Int. Cl.
*G01C 21/00* (2006.01)
*G01C 21/36* (2006.01)
*G01C 21/34* (2006.01)

(52) U.S. Cl.
CPC ......... *G01C 21/3694* (2013.01); *G01C 21/34* (2013.01); *G01C 21/3415* (2013.01); *G01C 21/3492* (2013.01); *G01C 21/36* (2013.01)

(58) Field of Classification Search
CPC . G01C 21/3694; G01C 21/34; G01C 21/3415
See application file for complete search history.

(56) References Cited

U.S. PATENT DOCUMENTS 6,256,577 B1 7/2001 Graunke
6,480,783 B1 11/2002 Myr
(Continued)

FOREIGN PATENT DOCUMENTS

DE 102010006702 A1 9/2010
EP 2068122 A2 6/2009
(Continued)

OTHER PUBLICATIONS

"U.S. Appl. No. 13/689,427, Non Final Office Action dated May 9, 2013", 8 pgs.
(Continued)

*Primary Examiner* — Adam M Alharbi
(74) *Attorney, Agent, or Firm* — Schwegman Lundberg & Woessner, P.A.

(57) ABSTRACT

A system and method for improved routing that combines real-time and likelihood information. In accordance with an embodiment, the system comprises a digital map/map information; a likelihood routing information; a route processor; wherein, when a request is received from a user/driver, or from another system, to receive a routing information, the system receives real-time information from a traffic-monitoring device or service providing real-time information; wherein the route processor adjusts the received real-time information based on the system's likelihood routing information; and wherein the routing information based on the combination of real-time and likelihood information can then be provided to the user/driver or other system in response to the original request.

20 Claims, 4 Drawing Sheets

Related U.S. Application Data continuation of application No. 14/182,345, filed on Feb. 18, 2014, now Pat. No. 9,188,452, which is a continuation of application No. 13/689,427, filed on Nov. 29, 2012, now Pat. No. 8,694,254.

(60) Provisional application No. 61/566,121, filed on Dec. 2, 2011.

(56) References Cited

U.S. PATENT DOCUMENTS

| | | | |
|---|---|---|---|
| 8,090,524 B2* | 1/2012 | Chapman | G01C 21/3691 701/117 |
| 8,185,302 B2 | 5/2012 | Schunder | |
| 8,392,110 B2 | 3/2013 | Schunder | |
| 8,694,254 B2 | 4/2014 | Fuchs | |
| 9,188,452 B2 | 11/2015 | Fuchs | |
| 9,541,413 B2 | 1/2017 | Witte et al. | |
| 9,685,076 B2* | 6/2017 | Mieth | G01C 21/32 |
| 10,082,403 B2* | 9/2018 | Fuchs | G01C 21/3492 |
| 2005/0003802 A1 | 1/2005 | Joseph | |
| 2005/0131634 A1 | 6/2005 | Ignatin | |
| 2006/0046732 A1 | 3/2006 | Grossman et al. | |
| 2006/0059024 A1 | 3/2006 | Bailey et al. | |
| 2009/0192702 A1 | 7/2009 | Bourne | |
| 2009/0248291 A1 | 10/2009 | Poppen | |
| 2009/0281721 A1 | 11/2009 | Yoshioka et al. | |
| 2010/0082227 A1 | 4/2010 | Posner et al. | |
| 2011/0166774 A1 | 7/2011 | Schunder | |
| 2011/0178698 A1 | 7/2011 | Aben et al. | |
| 2012/0053825 A1 | 3/2012 | Schunder | |
| 2012/0215432 A1 | 8/2012 | Uyeki | |
| 2012/0253929 A1 | 10/2012 | Alberth | |
| 2013/0144526 A1* | 6/2013 | Fuchs | G01C 21/3492 701/533 |
| 2014/0133646 A1 | 5/2014 | Ma et al. | |
| 2015/0168169 A1 | 6/2015 | Caceres et al. | |
| 2016/0054145 A1 | 2/2016 | Fuchs | |
| 2016/0105523 A1 | 4/2016 | Dowdell | |

FOREIGN PATENT DOCUMENTS

| | | |
|---|---|---|
| GB | 2431261 A | 4/2007 |
| WO | WO-2010076045 A1 | 7/2010 |

OTHER PUBLICATIONS

"U.S. Appl. No. 13/689,427, Notice of Allowance dated Nov. 25, 2013", 7 pgs.

"U.S. Appl. No. 13/689,427, Response filed Nov. 8, 2013 to Non Final Office Action dated May 9, 2013", 12 pgs.

"U.S. Appl. No. 14/182,345, Final Office Action dated Jan. 16, 2015", 11 pgs.

"U.S. Appl. No. 14/182,345, Non Final Office Action dated Jul. 8, 2014", 13 pgs.

"U.S. Appl. No. 14/182,345, Notice of Allowance dated Jul. 15, 2015", 9 pgs.

"U.S. Appl. No. 14/182,345, Response filed Apr. 15, 2015 to Final Office Action dated Jan. 16, 2015", 15 pgs.

"U.S. Appl. No. 14/182,345, Response filed Oct. 7, 2014 to Non Final Office Action dated Jul. 8, 2014", 9 pgs.

"U.S. Appl. No. 14/932,552, Final Office Action dated Jun. 15, 2017", 10 pgs.

"U.S. Appl. No. 14/932,552, Non Final Office Action dated May 9, 2016", 9 pgs.

"U.S. Appl. No. 14/932,552, Non Final Office Action dated Oct. 3, 2016", 10 pgs.

"U.S. Appl. No. 14/932,552, Non Final Office Action dated Oct. 6, 2017", 8 pgs.

"U.S. Appl. No. 14/932,552, Notice of Allowance dated May 23, 2018", 10 pgs.

"U.S. Appl. No. 14/932,552, Response filed Jan. 8, 2018 to Non Final Office Action dated Oct. 6, 2017", 9 pgs.

"U.S. Appl. No. 14/932,552, Response filed Mar. 29, 2017 to Non Final Office Action dated Oct. 3, 2016", 6 pgs.

"U.S. Appl. No. 14/932,552, Response filed Sep. 9, 2016 to Non Final Office Action dated May 9, 2016", 9 pgs.

"U.S. Appl. No. 14/932,552, Response filed Sep. 14, 2017 to Final Office Action dated Jun. 15, 2017", 11 pgs.

* cited by examiner

SYSTEM AND METHOD FOR IMPROVED ROUTING THAT COMBINES REAL-TIME AND LIKELIHOOD INFORMATION

CLAIM OF PRIORITY

This application is a continuation of application Ser. No. 14/932,552 filed on 4 Nov. 2015, which was a continuation of application Ser. No. 14/182,345 filed on 18 Feb. 2014, which was a continuation of application Ser. No. 13/389,427 titled "SYSTEM AND METHOD FOR IMPROVED ROUTING THAT COMBINES REAL-TIME AND LIKELIHOOD INFORMATION" filed 29 Nov. 2012 and claims the benefit of priority to U.S. Provisional Patent Application No. 61/566,121, titled "SYSTEM AND METHOD FOR IMPROVED ROUTING THAT COMBINES REAL-TIME AND LIKELIHOOD INFORMATION", filed Dec. 2, 2011; which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to map-based routing, as may be used in vehicle mapping systems, and are particularly related to a system and method for improved routing that combines real-time and likelihood information.

BACKGROUND

Map-based routing systems are often encountered in the form of an in-vehicle device which uses a global positioning system (GPS) sensor as a basis for displaying a map of the local area surrounding the vehicle, and providing a route for the driver to follow from an origin location to a destination location. The same techniques can be used, e.g., as part of a desktop computer application, or as a mobile telephone application, to provide a user with similar mapping and routing assistance.

Regardless of the platform used, for a routing system to provide useful assistance, it must have an accurate knowledge not just of the possible routes and their distances, but of their suitability with regard to, e.g., travel time, which can be affected by factors such as traffic, or ongoing construction. Since such factors are variable, some systems gather real-time information, e.g., via traffic-monitoring devices and services, and utilize that real-time information as part of its routing determinations. Other systems determine instead a statistical likelihood of, e.g., traffic at certain times of day, and use this likelihood information as part of its routing determinations. However, each approach has its disadvantages: real-time information may be useful, e.g., at the start of a shorter journey, but is less useful for longer or more complex trips, or trips starting at a later point in time; while statistical likelihoods may be useful in planning longer or more complex trips, but may not be able to take into account unusual changes in the traffic pattern. These are the general area that embodiments of the invention are intended to address.

SUMMARY

Disclosed herein is a system and method for improved routing that combines real-time and likelihood information. In accordance with an embodiment, the system comprises a digital map/map information; a likelihood routing information; a route processor; wherein, when a request is received from a user/driver, or from another system, to receive a routing information, the system receives real-time information from a traffic-monitoring device or service providing real-time information; wherein the route processor adjusts the received real-time information based on the system's likelihood routing information; and wherein the routing information based on the combination of real-time and likelihood information can then be provided to the user/driver or other system in response to the original request.

DETAILED DESCRIPTION

Disclosed herein is a system and method for improved routing that combines real-time and likelihood information. As described above, traditional approaches to map-based routing have disadvantages: real-time information may be useful, e.g., at the start of a shorter journey, but is less useful for longer or more complex trips, or trips starting at a later point in time; while statistical likelihoods may be useful in planning longer or more complex trips, but may not be able to take into account unusual changes in the traffic pattern. In accordance with an embodiment, the system combines both real-time and likelihood information to provide a routing system with improved routing.

Figure 1:
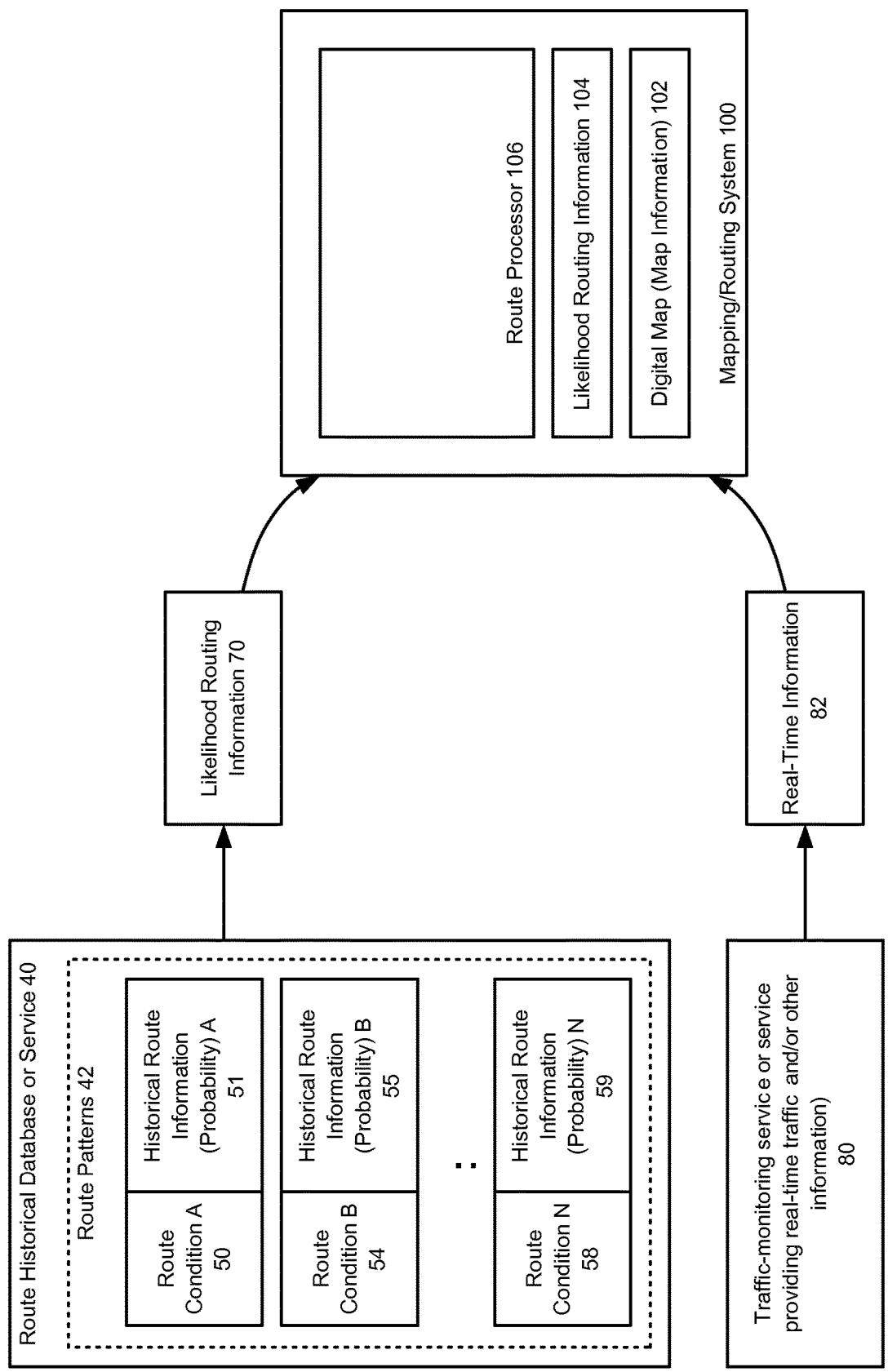
FIG. 1 shows an illustration of a system for improved routing that combines real-time and likelihood information, in accordance with an embodiment.

FIG. 1 shows an illustration of a system for improved routing that combines real-time and likelihood information, in accordance with an embodiment. As shown in FIG. 1, a route historical database or service 40 can include or otherwise provide historical information about a plurality of routes, based on particular conditions and probabilities associated therewith.

For example, in accordance with an embodiment, the route historical database or service can include information about which routes are likely to have particular characteristics (e.g., that the route is congested, or that the route requires payment of tolls) under particular conditions (e.g., a particular time of day, particular calendar dates, or particular weather conditions). Each historical information can be associated with a probability—for example, a particular route during the hours of Friday at 4-5 pm on school calendar days is congested 90% of the time.

In accordance with an embodiment, the historical information can be stored as a plurality of route patterns 42 including, for each pattern, a defined route condition 50, 54, 58, such as a time interval or a weather type, and a historical route information probability 51, 55, 59 that the route will have particular characteristics under the defined conditions. This historical information can be subsequently provided as likelihood routing information 70, either in an on-demand fashion, or for persistent storage within a mapping/routing system.

Figure 2:
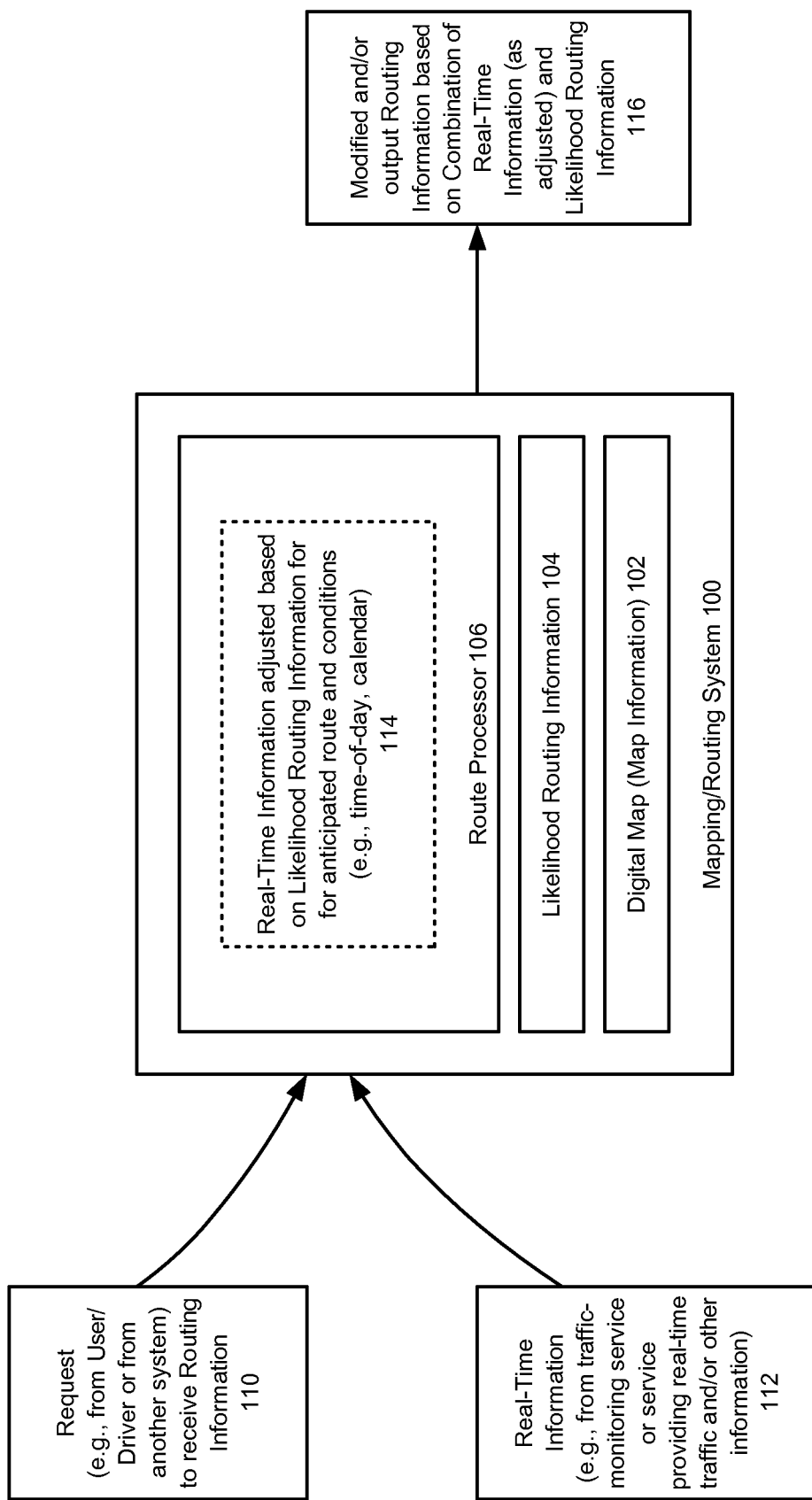
FIG. 2 further illustrates a system for improved routing that combines real-time and likelihood information, in accordance with an embodiment.

As further shown in FIG. 2, a traffic monitoring device or service, or other service that provides real-time traffic and/or other information 80, can be used to provide real-time information 82, e.g., information describing current traffic patterns, construction advisories, or weather information.

In accordance with an embodiment, both the likelihood routing information, and the real-time information, can be provided to a mapping/routing system 100 which is itself provided, e.g., within a vehicle or as a handheld system, and which includes a digital map or map information 102, and a route processor 106. As described above, in accordance with some embodiments the likelihood routing information can be persistently stored 104 within the mapping/routing system; while in other embodiments the likelihood routing information can be provided on-demand.

FIG. 2 further illustrates a system for improved routing that combines real-time and likelihood information, in accordance with an embodiment. As shown in FIG. 2, when a request 110 is received from a user/driver, or from another system, to receive a routing information, e.g., a route for the user/driver to follow from an origin location to a destination location, the system receives real-time information 112 from the traffic-monitoring device or service. The route processor adjusts 114 the received real-time information for the anticipated route based on the system's likelihood routing information. The routing information based on the combination of real-time and likelihood information 116 can then be modified and/or provided to the user/driver or other system in response to the original request.

Figure 3:
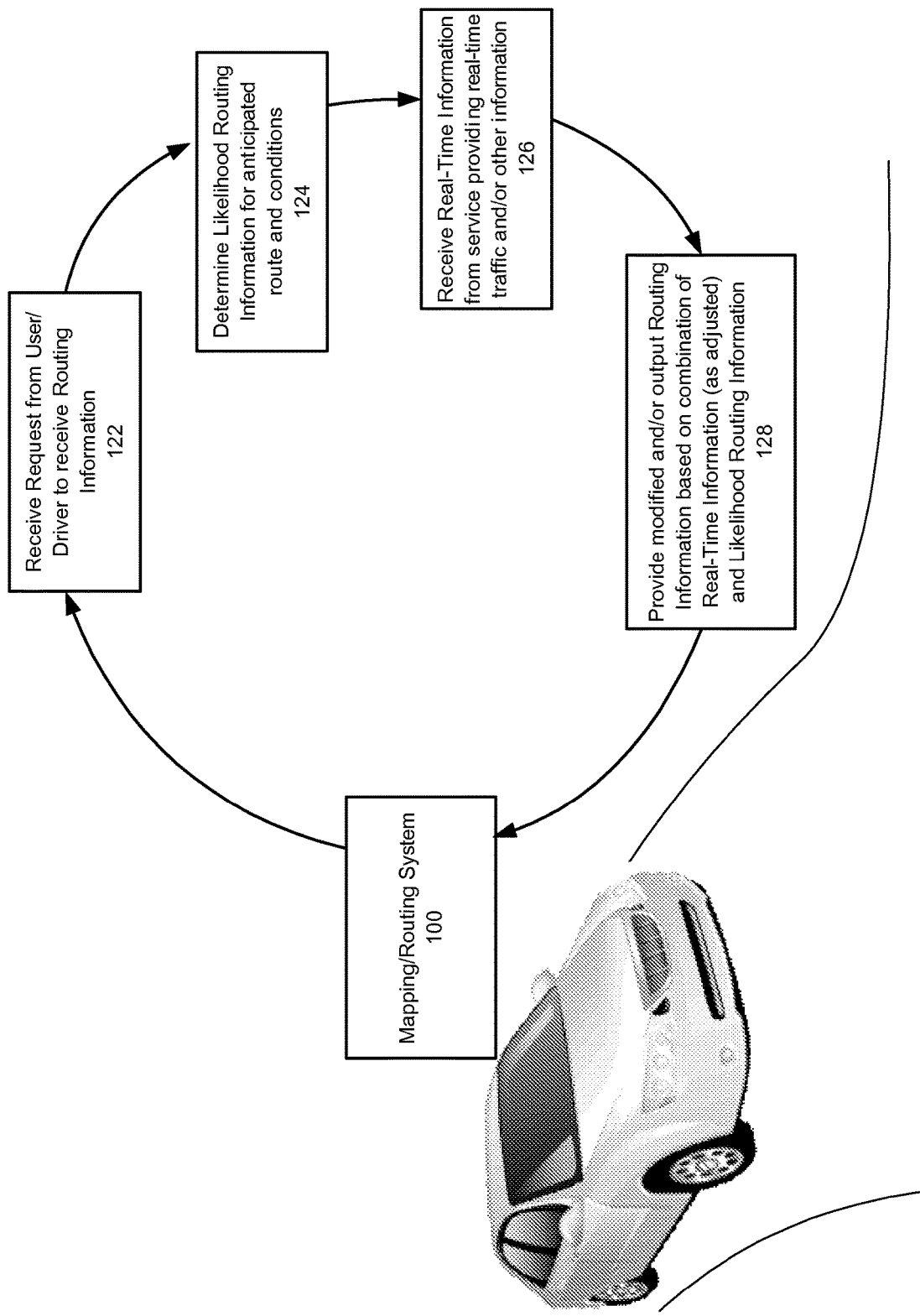
FIG. 3 illustrates the use of a system for improved routing that combines real-time and likelihood information, in accordance with an embodiment.

FIG. 3 illustrates the use of a system for improved routing that combines real-time and likelihood information, in accordance with an embodiment. As shown in FIG. 3, the mapping/routing system can be provided within a vehicle, e.g., as a component of a GPS-type navigation system. When a request is received 122, in this example from a driver, to receive a routing information, the system determines a likelihood routing for the anticipated route and conditions 124, receives real-time information from a traffic-monitoring device or service providing real-time information 126, and adjusts the received real-time information based on the system's likelihood routing information 128.

For example, if the driver intends to drive a particular route at 5:00 pm, and the system determines, based on historical information, that a particular road on the route is likely to become 30% more congested at 5:00 pm than it is at 4:00 pm, and real-time information received at 4:00 pm indicates ongoing construction on that road, then the route processor can adjust its traffic estimates to account for the likelihood of increased traffic and slower drive-time using that road, which may lead to the route processor choosing an alternate route.

The routing information based on the combination of real-time and likelihood information can then be provided to the user/driver or other system in response to the original request.

Figure 4:
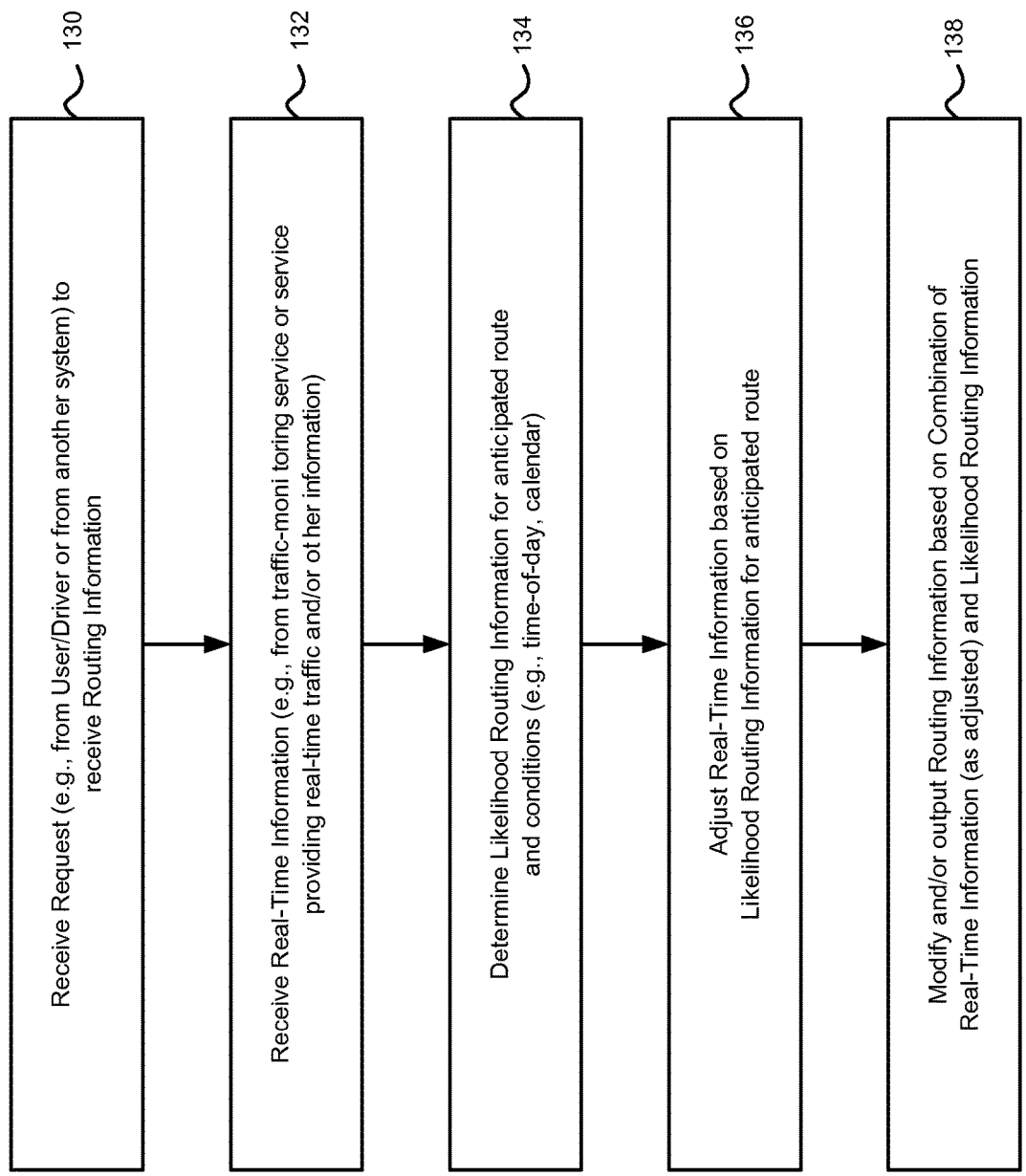
FIG. 4 shows a flowchart of a method for improved routing that combines real-time and likelihood information, in accordance with an embodiment.

FIG. 4 shows a flowchart of a method for improved routing that combines real-time and likelihood information, in accordance with an embodiment. As shown in FIG. 4, at step 130, a request is received, e.g., from a user/driver, or from another system, to receive routing information.

At step 132, the system receives real-time information, e.g., from a traffic-monitoring service or other service providing real-time traffic and/or other information.

At step 134, likelihood routing information is determined for the anticipated rout and conditions, e.g., the time-of-day, or calendar.

At step 136, the real-time information is adjusted based on the system's likelihood routing information for the anticipated route.

At step 138, the routing information, adjusted based on the combination of real-time and likelihood information, can then be modified and/or provided to the user/driver or other system in response to the original request.

The present invention may be conveniently implemented using one or more conventional general purpose or specialized digital computers or microprocessors programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A computer-implemented method comprising:

receiving, by at least one hardware processor, a request for routing information from a user device;

receiving, by at least one hardware processor, real-time information about at least one of traffic, construction, and weather from a condition-monitoring service;

receiving, by at least one hardware processor, likelihood routing information from a route historical database, the likelihood routing information being stored in the route historical database and comprising:

a plurality of routes, and, for each one of the plurality of routes, one or more defined conditions together with a probability that the route will have one or more particular characteristics under the one or more defined conditions, the probability comprising a likelihood that a traffic level for the route or a drive time for the route will be affected in a particular way under the one or more defined conditions;

generating, by at least one hardware processor, the routing information based on the received real-time information and the likelihood routing information; and transmitting, by at least one hardware processor, the generated routing information to the user device based on the request.

2. The computer-implemented method of claim 1, wherein the likelihood comprises a numerical likelihood.

3. The computer-implemented method of claim 2, wherein the numerical likelihood comprises a percentage likelihood.

4. The computer-implemented method of claim 1, wherein the likelihood comprises a likelihood that the route will have increased traffic or a slower drive time under the one or more defined conditions.

5. The computer-implemented method of claim 1, wherein the user device comprises a Global Positioning System (GPS) navigation system.

6. The computer-implemented method of claim 1, wherein the one or more defined conditions comprise at least one of a particular calendar date, a particular time of day, a particular weather condition.

7. The computer-implemented method of claim 1, wherein the request for routing information comprises a request for routing information for a user of the user device to follow from an origin location to a destination location, and the generated routing information comprises routing information for the user of the user device to follow from the origin location to the destination location.

8. A system comprising:
at least one hardware processor; and
a non-transitory computer readable medium having instructions stored thereon which when read and executed by a computer cause the computer to perform operations comprising:
receiving a request for routing information from a user device;
receiving real-time information about at least one of traffic, construction, and weather from a condition-monitoring service;
receiving likelihood routing information from a route historical database, the likelihood routing information being stored in the route historical database and comprising:
a plurality of routes, and, for each one of the plurality of routes, one or more defined conditions together with a probability that the route will have one or more particular characteristics under the one or more defined conditions, the probability comprising a likelihood that a traffic level for the route or a drive time for the route will be affected in a particular way under the one or more defined conditions;
generating the routing information based on the received real-time information and the likelihood routing information; and
transmitting the generated routing information to the user device based on the request.

9. The system of claim 8, wherein the likelihood comprises a numerical likelihood.

10. The system of claim 9, wherein the numerical likelihood comprises a percentage likelihood.

11. The system of claim 8, wherein the likelihood comprises a likelihood that the route will have increased traffic or a slower drive time under the one or more defined conditions.

12. The system of claim 8, wherein the user device comprises a Global Positioning System ((SPS) navigation system.

13. The system of claim 8, wherein the one or more defined conditions comprise at least one of a particular calendar date, a particular time of day a particular weather condition.

14. The system of claim 8, wherein the request for routing information comprises a request for routing information for a user of the user device to follow from an origin location to a destination location, and the generated routing information comprises routing information for the user of the user device to follow from the origin location to the destination location.

15. A non-transitory computer readable medium having instructions stored thereon which when read and executed by a computer cause the computer to perform operations comprising:
receiving a request for routing information from a user device;
receiving real-time information about at least one of traffic, construction, and weather from a condition-monitoring service;
receiving likelihood routing information from a route historical database, the likelihood routing information being stored in the route historical database and comprising:
a plurality of routes, and, for each one of the plurality of routes, one or more defined conditions together with a probability that the route will have one or more particular characteristics under the one or more defined conditions, the probability comprising a likelihood that a traffic level for the route or a drive time for the route will be affected in a particular way under the one or more defined conditions;
generating the routing information based on the received real-time information and the likelihood routing information; and
transmitting the generated routing information to the user device based on the request.

16. The non-transitory computer readable medium of claim 15, wherein the likelihood comprises a numerical likelihood.

17. The non-transitory computer readable medium of claim 16, wherein the numerical likelihood comprises a percentage likelihood.

18. The non-transitory computer readable medium of claim 15, wherein the likelihood comprises a likelihood that the route will have increased traffic or a slower drive time under the one or more defined conditions.

19. The non-transitory computer readable medium of claim 15, wherein the request for routing information comprises a request for routing information for a user of the user device to follow from an origin location to a destination location, and the generated routing information comprises routing information for the user of the user device to follow from the origin location to the destination location.

20. The non-transitory computer readable medium of claim 15, wherein the one or more defined conditions comprise at least one of a particular calendar date, a particular time of day, a particular weather condition.

* * * * *

UNITED STATES PATENT AND TRADEMARK OFFICE
CERTIFICATE OF CORRECTION

| | |
|---|---|
| PATENT NO. | : 10,539,427 B2 |
| APPLICATION NO. | : 16/117773 |
| DATED | : January 21, 2020 |
| INVENTOR(S) | : Gil Fuchs |

It is certified that error appears in the above-identified patent and that said Letters Patent is hereby corrected as shown below:

On the Title Page

In item (54), in "Title", in Column 1, Line 3, after "INFORMATION", insert --FOR TRAFFIC, CONSTRUCTION AND WEATHER--

In the Specification

In Column 1, Line 3, after "INFORMATION", insert --FOR TRAFFIC, CONSTRUCTION AND WEATHER--

In the Claims

In Column 6, Line 6, in Claim 12, delete "((SPS)" and insert --(GPS)-- therefor

In Column 6, Line 10, in Claim 13, after "day", insert --,--

Signed and Sealed this
Twenty-ninth Day of September, 2020

Andrei Iancu
*Director of the United States Patent and Trademark Office*